No. 774,430. PATENTED NOV. 8, 1904.
C. R. INGHAM.
GAS MANUFACTURING APPARATUS.
APPLICATION FILED SEPT. 23, 1903.
NO MODEL. 3 SHEETS—SHEET 1.
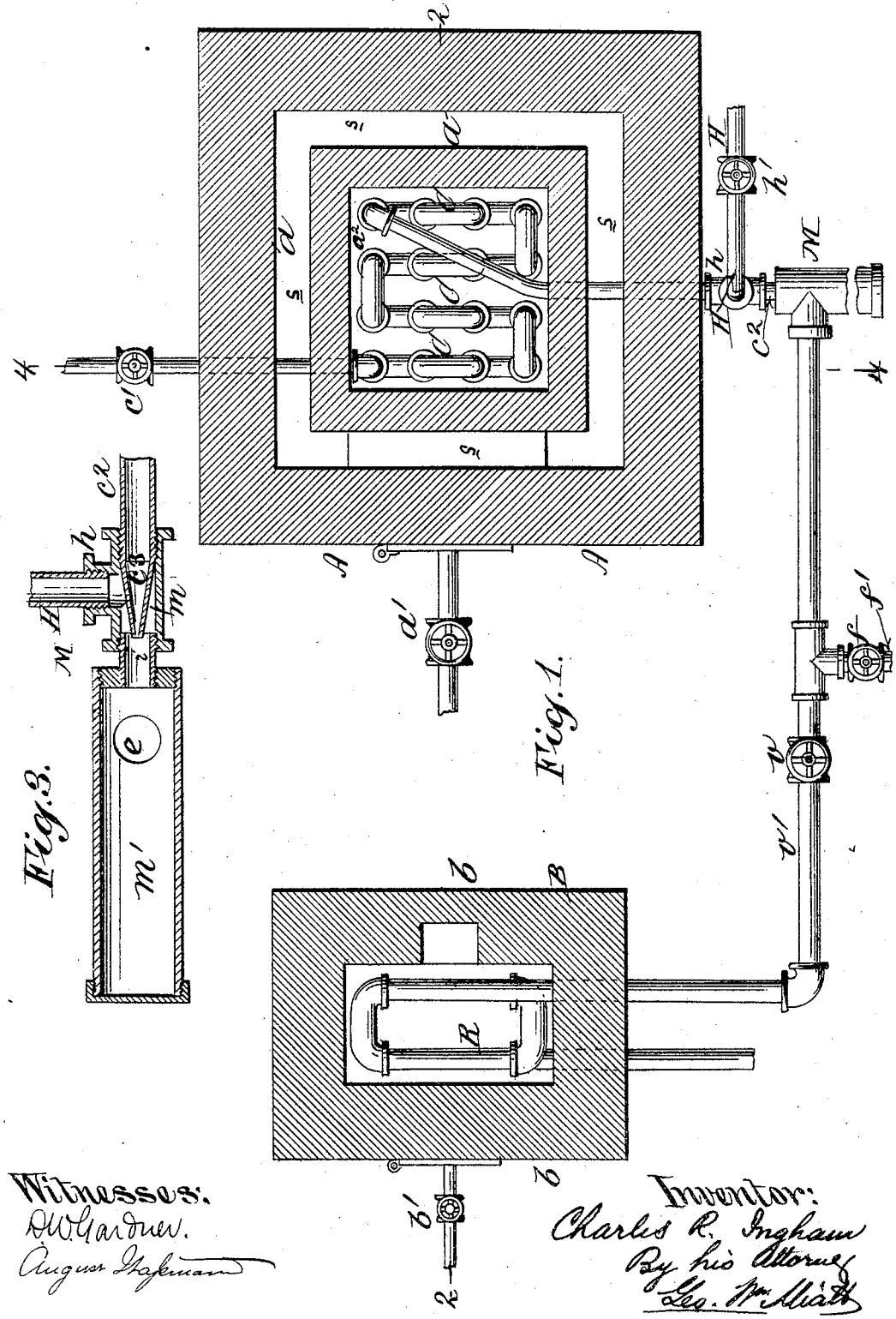
Witnesses:
O.W. Gardner.
August Hakman
Inventor:
Charles R. Ingham
By his Attorney
Geo. Wm. Miatt

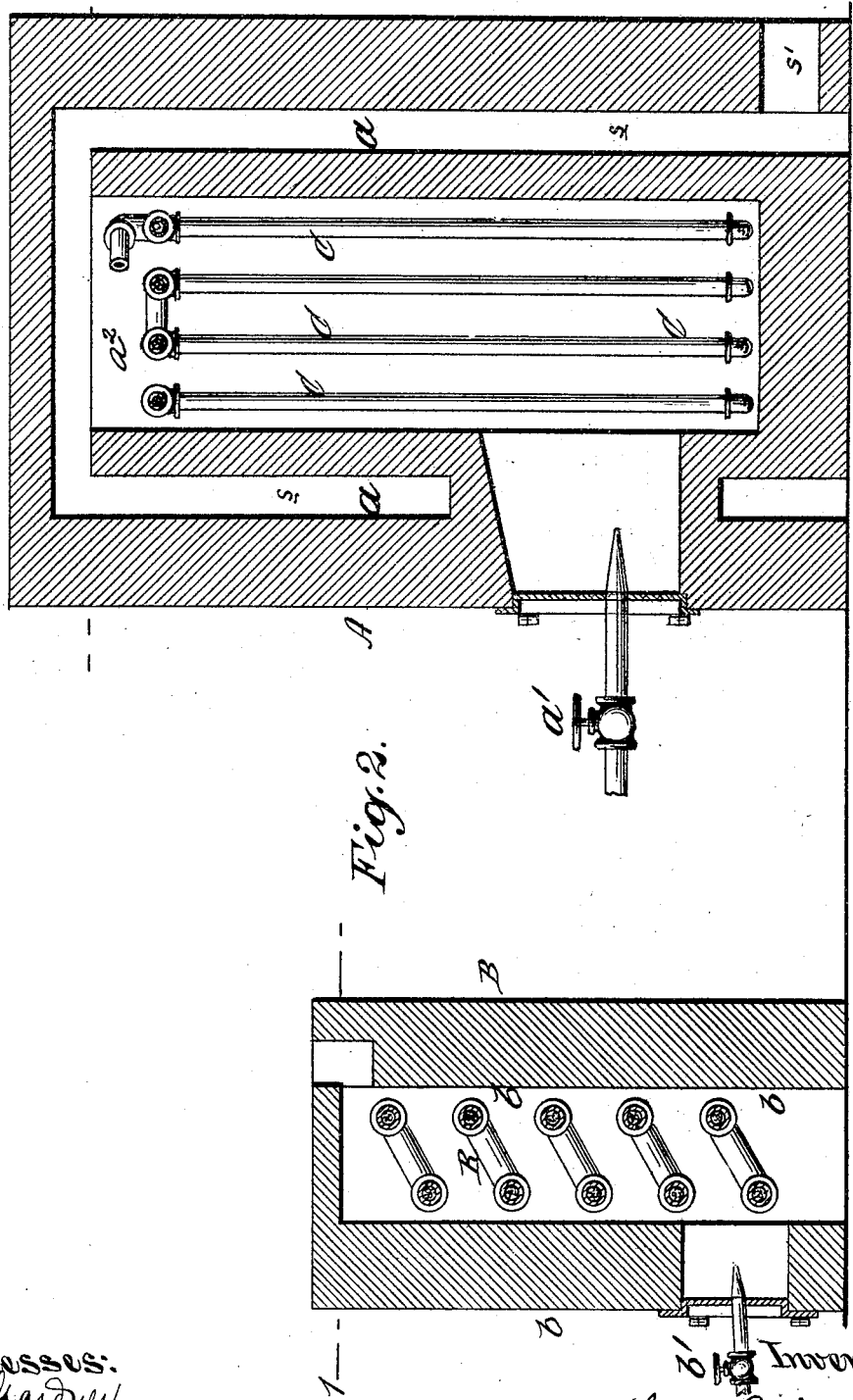

No. 774,430. PATENTED NOV. 8, 1904.
C. R. INGHAM.
GAS MANUFACTURING APPARATUS.
APPLICATION FILED SEPT. 23, 1903.
NO MODEL. 3 SHEETS—SHEET 3.

Witnesses:
D. W. Gardner.
August Hafmann

Inventor:
Charles R. Ingham
By his Attorney
Geo. H. Mitt

No. 774,430. Patented November 8, 1904.

UNITED STATES PATENT OFFICE.

CHARLES R. INGHAM, OF SUFFERN, NEW YORK.

GAS-MANUFACTURING APPARATUS.

SPECIFICATION forming part of Letters Patent No. 774,430, dated November 8, 1904.

Application filed September 23, 1903. Serial No. 174,250. (No model.)

*To all whom it may concern:*

Be it known that I, CHARLES R. INGHAM, a citizen of the United States, residing at Suffern, Rockland county, and State of New York, have invented certain new and useful Improvements in Gas-Manufacturing Apparatus, of which the following is a specification sufficient to enable others skilled in the art to which the invention appertains to make and use the same.

The invention consists, primarily, in the special construction of the retorts used in the apparatus, each retort being formed entirely of a plurality of pipes of small but uniform diameter situated and connected together directly within its furnace, the pipes being filled loosely with fragmentary refractory material whereby a single long tortuous passage of practically uniform area in cross-section is produced in which the refractory material is evenly and highly heated, the refractory material in the center being as hot as that in contact with the sides of the piping.

My invention also includes certain features in the construction and arrangement of parts hereinafter described and claimed specifically.

Figure 4:
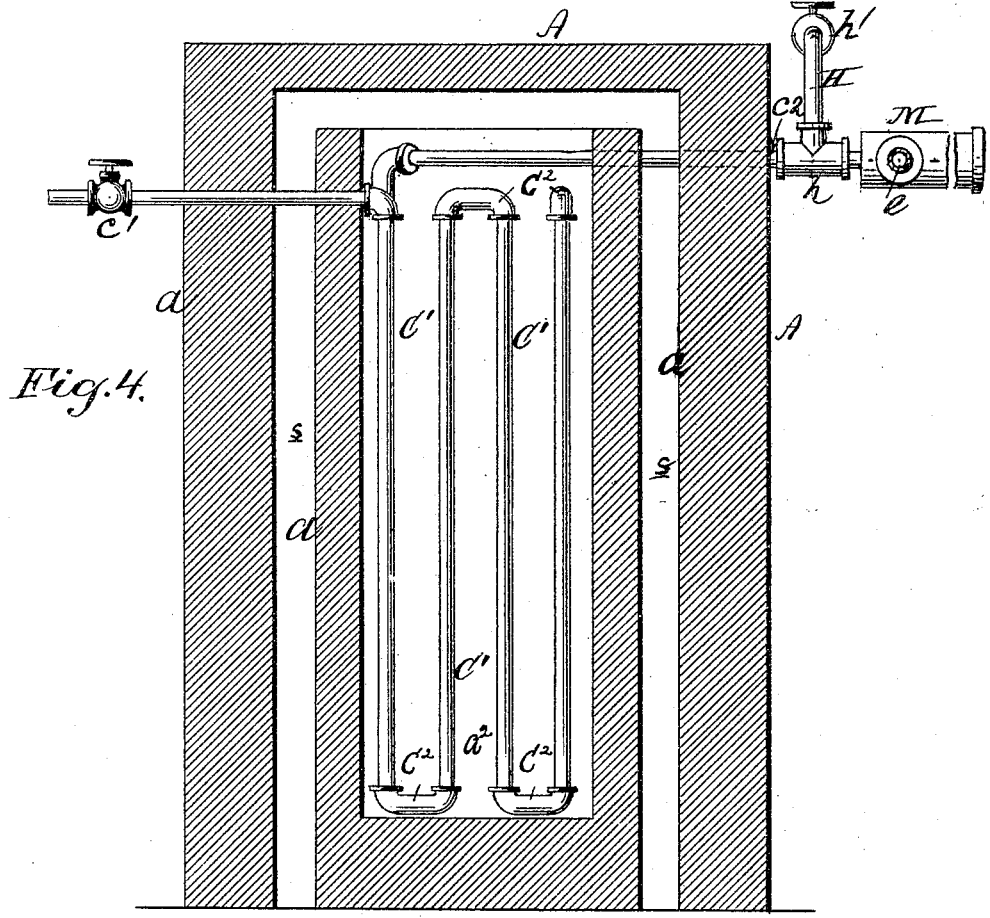
Figure 5:
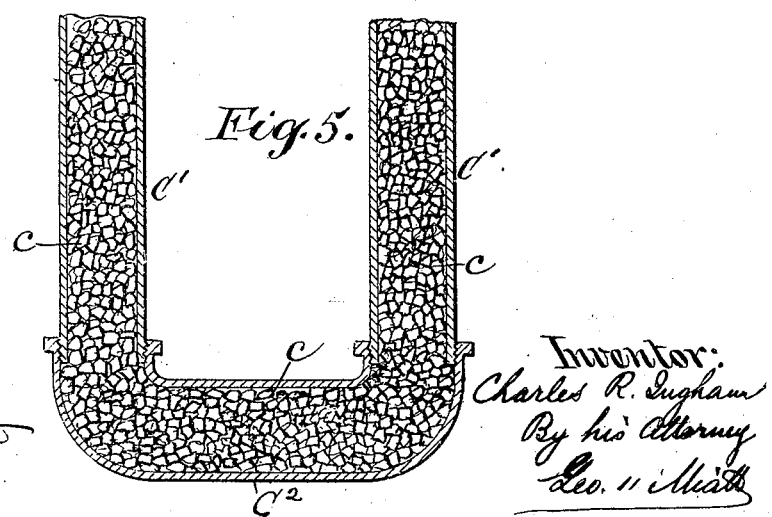

In the accompanying drawings, Figure 1 is a sectional view taken on the horizontal plane 1 1, Fig. 2, showing the essential parts of my apparatus. Fig. 2 is a vertical sectional elevation taken upon plane of line 2 2, Fig. 1. Fig. 3 is a sectional view of the mixer. Fig. 4 is a vertical section of the decomposing-furnace upon plane of line 4 4, Fig. 1, showing the retort-pipes, &c., in elevation. Fig. 5 is a sectional view, upon an enlarged scale, of a portion of the retort-piping.

The walls $a$ $a$ of the primary furnace A and the walls $b$ $b$ of the secondary furnace B are built of any suitable refractory material and of any shape desired. Both furnaces may be heated by any means which may be found expedient. Oil or gas burners $a'$ and $b'$ are shown symbolically in the drawings; but it is obvious that the source of heat and the mode of application are of minor importance.

Situated in the primary furnace A is a superheating-retort C, consisting of a series of pipes $C'$ $C'$ of small diameter, connected together so as to form within the furnace one long continuous conduit of practically the same area in cross-section throughout, said pipes $C'$ $C'$ and their connecting-elbows $C^2$ $C^2$ being loosely filled with a packing of irregular-shaped fragmentary refractory material $c$ for the purpose of increasing the internal heating-surface of the retort or conduit as a whole, the refractory material used being preferably broken and irregular in character, so as to insure the formation of interstices and irregular passages between the opposed surfaces of the refractory material.

I prefer to use a primary furnace A, having a central combustion-chamber $a^2$, in which the retort-pipes $C'$ $C'$ and connections $C^2$ $C^2$ are situated, and by the walls of which they are inclosed except at top, where the combustion-chamber $A'$ communicates with the space $s$ between the inner and outer walls of the furnace, which space $s$ surrounds the combustion-chamber $a^2$, and by conducting the products of combustion downward to the exit $s'$ maintains a high degree of heat within the combustion-chamber $a^2$, thereby insuring a uniform temperature throughout the retort-pipes $C'$ $C'$.

Retort-pipes $C'$ $C'$ and connecting-elbows $C^2$ $C^2$ of small diameter in cross-section are purposely chosen to form the continuous superheating-retort C in order that the filling of fragmentary refractory material $c$ may become thoroughly and uniformly heated throughout. In other words, it is essential in my invention that the refractory material in the center of the pipes $C'$ $C'$ and connections $C^2$ $C^2$ shall be as hot as that in contact with the sides of the pipe in order to insure the best and most economical results, and this I attain by the use of pipes so small in diameter that the passage of the steam cannot cool off the refractory material in the center of the pipes, as would be the case were pipes of relatively large diameter used in the formation of the retort. It is this feature of close and intimate contact of a relatively small narrow line or column of fragmentary refractory material with the sides of the retort-pipes of comparatively small diameter that distinguishes my invention from the prior state of the art and enables me to attain practical advantages in the manufacture of gas in a commercial sense. Another feature of importance in this connection is the use of a plurality of pipes and connections of practically uniform diameter to form a continuous retort of great length entirely within the primary furnace, so that a maximum of heating-surface for the steam forced through the retort is attained with a practically uniform temperature from one end of the retort to the other.

I have found by actual experience that various refractory materials may be used with like results, the object being not to effect chemical reaction therewith, but simply to retard the passage of the stream and insure a tortuous passage therefor over highly-heated surfaces of uniform temperature, resulting from the relatively small area of the retort-pipes in cross-section, said pipes in practice being seam-welded and of extra thickness to preserve their integrity in the intense heat to which they are subjected. I have thus used as a loose filling for the retort-pipes $C'$ $C'$ and connections $C^2$ $C^2$ cast-iron, porcelain, ajax metal, fire-brick, and other broken and irregular refractory material without detecting any material change in the nature of the gas produced. I have found by actual experiment and continuous use that good and satisfactory results may be economically attained by making the retort-pipes $C'$ $C'$ and connections $C^2$ $C^2$ of wrought-iron and filling them with refractory material $c$, consisting of broken cast-iron, which latter may be heated to nearly its melting-point (say 2,800° Fahrenheit) without danger to the wrought-iron pipes $C'$ $C'$ and connections $C^2$ $C^2$, which have a higher melting-point, (say 2,960° Fahrenheit.) This enables me to superheat the steam to a relatively high degree before introducing it into the hydrocarbon in the mixing-chamber M. I do not, however, restrict myself to the use of wrought cast-iron pipes $C'$ $C'$ and connections $C^2$ $C^2$, since the use of iron pipes is practicable provided the temperature is not raised to the melting-point of cast-iron. When cast-iron pipes and connections are thus used, they may be filled with any desired or suitable refractory material $c$ of the requisite degree of coarseness and surface.

Steam under pressure from any source is admitted through the valve $c'$ to the series of retort-pipes $C'$ $C^2$, its tortuous passage therein over the irregular surface of the refractory material $c$ superheating it to a relatively high degree before it passes out through the exit-pipe $c^2$ to the mixer M. The mixer M consists of an injector $m$ and chamber $m'$. The end of the pipe $c^2$ is contracted to form a nozzle $c^3$ within the cross-head $h$, which is connected by means of the pipe H with a source of supply of liquid or gaseous hydrocarbon, which is drawn by the superheated steam escaping under pressure from the nozzle $c^3$ into the chamber $m'$. The chamber $m'$ is preferably elongated, as indicated in Fig. 3 of the drawings, and its exit $e$ is near the inlet $i$, so that the superheated steam injected from the retort-pipes $C'$, together with the induced supply of hydrocarbon, have to work back against the blast from the nozzle before the resulting admixture can escape through the said exit $e'$, thereby insuring an effectual combination in both a mechanical and chemical sense of the superheated steam and the hydrocarbons.

While I do not confine myself to the use of any particular form or grade of hydrocarbon, either fluid or gaseous, I will cite, by way of illustration, the use of what is commercially known as "gas-oil," consisting, substantially, of ninety-eight per cent. hydrocarbon and two per cent. of coke or other solid residuum. I then have, as a result of the superheated steam passing from the nozzle $c^3$ under pressure and in a highly-heated and nascent condition, carbonic acid, ($CO_2$,) 7.8; oxygen, (O,) 1.6; carbon monoxid, (CO,) 15.8; nitrogen, (N,) 11.6; ethylene, ($C_2H_4$,) 0.0; methane, ($CH_4$,) 0.0; hydrogen, (H,) 58.2; total, one hundred. These in a nascent condition impinging upon and breaking up the above-named gas-oil result in carbonic acid, ($CO_2$,) 1.40; oxygen, (O,) two; carbon monoxid, (CO,) 3.80; nitrogen, (N,) 8.60; ethylene, ($C_2H_4$,) 18.60; methane, ($CH_4$,) 27.20; hydrogen, (H,) 38.40; total, one hundred, which may be fixed into an illuminating-gas by passing it through a retort R in the secondary furnace B. The chemical reactions take place within the inlet $i$ and mixing-chamber $m'$, and the succeeding superheating when resorted to is simply for the purpose of preventing subsequent condensation by reduction of temperature and to insure a permanent dry gas for illuminating purposes. The resulting fuel-gas may be conducted through the valve $f$ (the valve $v$ being closed) and pipe $f'$ to any desired point. If, however, it is desired to convert the gas into a fixed illuminating-gas, the valve $f$ is closed and the valve $v$ opened, admitting the gas from the mixer M, through the pipe $v'$, into the retort-coil R in the furnace B. The retort-coil R is packed with refractory material in the same manner as are the retort-pipes $C'$ $C'$ and connections $C^2$ $C^2$, and in its passage through the coil R the gas is fixed to be afterward purified and treated in the manner well known. The retort-coil R is heated in any desired or well-known manner, the gas-burner $b'$ being shown symbolically to represent any well-known expedient.

It will be seen that by my apparatus I am enabled to carry on the manufacture of either fuel or illuminating gas continuously and to regulate the relative proportion of hydrocarbon present in the resultant gas with accuracy by means of a valve $h'$ or other suitable mechanical expedient interposed in the pipe H between the mixer M and the source of supply of hydrocarbon.

The presence of the irregular packing of refractory material in both the retorts C and R is of importance, especially in the case of the pipes C' C' and connections $C^2$ $C^2$ in the superheating-retort C, since it insures the thorough superheating of the steam and its introduction in a nascent state into the mixer M in the most favorable condition for admixture and combination with the hydrocarbon. That there are certain practical advantages in the use of a retort C, substantially such as shown in the drawings, consisting of a series of pipes C' C' and connections $C^2$ $C^2$, united within the furnace to form a continuous passage of relatively great length as compared with the area of the passage in cross-section, I have demonstrated by actual and continuous trial and experiment, since I thereby attain and maintain the maximum temperature in the center of the conduit, as well as at the sides thereof, while the long, narrow, and tortuous passage, of practically uniform width throughout, affords a high degree of resistance to the passage of the steam and crowds it into intimate contact with the fragmentary refractory material, so that it is economically superheated into a highly-nascent condition. Thus in practice I have found that steam introduced into the retort C at one hundred pounds pressure could be made to encounter such resistance in the retort-pipes C' C' and connections $C^2$ $C^2$, owing to the numerous bends in the retort as a whole, as well as to the presence of the highly-heated surfaces of refractory material c, that the highly-superheated steam thus attained would enter the mixer M at a pressure approximately of twenty-five pounds only. It will thus be seen that the smallness in area in cross-section of my retort-pipes C' and connections $C^2$ is an important factor in my invention, since I thereby insure an even temperature within the retort and avoid the possibility of a central area of lesser temperature through which the steam might pass, while by the use of a suitable number of pipes C', connected together to form a single retort, I can attain any desired length of passage and heating-surface entirely within the furnace, the repeated "doubling" of the conduit or retort as a whole increasing the resistance to be overcome and affording a maximum of length of conduit within the minimum of space.

What I claim as my invention, and desire to secure by Letters Patent, is—

1. In gas apparatus, the combination of a furnace, a steam-superheating retort consisting of a plurality of pipes of small diameter connected together and situated entirely within said furnace and filled loosely with fragmentary refractory material so as to afford a single continuous long narrow tortuous conduit within the furnace of practically uniform area in cross-section throughout, for the passage of steam introduced under pressure into the retort, a mixer, having means for forcing the gas generated therein to work back against the pressure of the incoming steam and hydrocarbon before escaping from the mixer, means for introducing a supply of hydrocarbon into said mixer, means for causing the superheated steam from the said retort to impinge upon the hydrocarbon introduced into the mixer, and means for drawing off the resultant gas from the mixer.

2. In gas apparatus the combination of a furnace, a steam-superheating retort consisting of a plurality of pipes of small diameter connected together and situated entirely within said furnace and filled loosely with fragmentary refractory material so as to afford a single continuous long narrow tortuous conduit within the furnace of practically uniform area in cross-section throughout, for the passage of steam introduced under pressure into the retort, a mixer, means for introducing a supply of hydrocarbon into said mixer, means for causing the superheated steam from the said retort to impinge upon the hydrocarbon introduced into the mixer, means for drawing off the resultant gas from the mixer, having means for forcing the gas generated therein to work back against the pressure of the incoming steam and hydrocarbon before escaping from the mixer and means for fixing the said gas to convert it into illuminating-gas.

3. In gas apparatus the combination of a furnace, a steam-superheating retort consisting of a plurality of pipes of small diameter connected together and situated entirely within said furnace and filled loosely with fragmentary refractory material so as to afford a single continuous long narrow tortuous conduit within the furnace of practically uniform area in cross-section throughout, for the passage of steam introduced under pressure into the retort, a mixer formed with an elongated mixing-chamber having an outlet in proximity to its inlet, so that the gas generated in the chamber has to work back against the pressure of the incoming steam and hydrocarbon in order to escape from the mixer, means for introducing a supply of hydrocarbon into said mixing-chamber, means for causing the superheated steam from said retort to impinge upon the hydrocarbon as it is introduced into the mixing-chamber, and means for drawing off the resultant gas from the mixer.

4. In gas apparatus the combination of a furnace, a steam-superheating retort consisting of a plurality of pipes of small diameter connected together and situated entirely within said furnace and filled loosely with fragmentary refractory material so as to afford a single continuous long narrow tortuous conduit within the furnace of practically uniform area in cross-section throughout, for the passage of steam introduced under pressure into the retort, a mixer formed with an elongated mixing-chamber having an outlet in proximity to its inlet so that the gas generated in the chamber has to work back against the pressure of the incoming steam and hydrocarbon in order to escape from the mixer, means for introducing a supply of hydrocarbon into said mixing-chamber, means for causing the superheated steam from said retort to impinge upon the hydrocarbon as it is introduced into the mixing-chamber, means for drawing off the resultant gas from the mixer, and means for fixing the said gas to convert it into an illuminating-gas.

5. In gas apparatus, the combination of a primary furnace, a steam-superheating retort in said primary furnace consisting of a plurality of relatively long narrow pipes connected together and situated entirely within the combustion-chamber of the said primary furnace and filled loosely with fragmentary refractory material so as to form a single continuous long narrow tortuous passage within the furnace of practically uniform area in cross-section throughout, for the passage of the steam introduced under pressure into the retort, a mixer, means for introducing a supply of hydrocarbon into said mixer, means for causing the gas generated therein to work back against the pressure of the incoming steam and hydrocarbon before escaping from the mixing-chamber, means for causing the superheated steam from the retort to impinge upon the hydrocarbon introduced into the mixer, means for drawing off the resultant gas and transferring it to a retort in a secondary furnace, said secondary furnace, and said retort in the secondary furnace consisting of a plurality of pipes of small diameter connected together within the combustion-chamber of the secondary furnace and filled loosely with fragmentary refractory material to form a single long tortuous passage in which the gas is fixed into an illuminating-gas, together with means for withdrawing the resultant illuminating-gas from said secondary retort.

6. In gas apparatus the combination of a furnace, a steam-superheating retort consisting of a plurality of pipes of small diameter connected together and situated entirely within said furnace and filled loosely with fragmentary refractory material so as to afford a single continuous long narrow tortuous conduit within the furnace of practically uniform area in cross-section throughout, for the passage of steam introduced under pressure in the retort, a mixer, formed with an elongated mixing-chamber having an outlet in proximity to its inlet for the purpose described, means for introducing a supply of hydrocarbon into said elongated mixing-chamber, means for regulating the supply of hydrocarbon thus introduced, means for causing the superheated steam from the retort to impinge upon the hydrocarbon as it is introduced into said elongated mixing-chamber, and means for drawing off the resultant gas from said mixer.

7. In gas apparatus, the combination of a furnace, a steam-superheating retort consisting of a plurality of wrought-iron pipes of small diameter connected together and situated entirely within said furnace and filled loosely with fragmentary cast-iron so as to afford a single continuous long narrow tortuous conduit within the furnace of practically uniform area in cross-section throughout, for the passage of steam introduced under pressure into the retort, a mixer formed with an elongated chamber with outlet in proximity to its inlet, means for introducing a supply of hydrocarbon into said mixer, means for causing the superheated steam from said retort to impinge upon the hydrocarbon introduced into the mixer, and means for drawing off the resultant gas from the mixer.

8. In gas apparatus, the combination of a furnace, a steam-superheating retort within said furnace consisting of a plurality of relatively long narrow pipes of small but substantially uniform diameter in cross-section connected together and situated entirely within the said furnace and filled loosely with fragmentary refractory material to form a single long tortuous passage of a prescribed width within the furnace for steam introduced under pressure into the retort, a mixer formed with an elongated chamber with outlet in proximity to its inlet, means for introducing a supply of hydrocarbon into said mixer, means for causing the superheated steam from the retort to impinge upon the hydrocarbon introduced into the mixer, and means for drawing off the resultant gas from the mixer.

9. In gas apparatus, the combination of a furnace formed with a combustion-chamber surrounded by an outer wall between which and the wall of the combustion-chamber is formed a space for the passage of the products of combustion, a steam-superheating retort within said combustion-chamber consisting of a plurality of pipes of small diameter connected together and situated entirely within said combustion-chamber and filled loosely with fragmentary refractory material so as to afford a single continuous long narrow tortuous conduit within the combustion-chamber of practically uniform area in cross-section throughout, for the passage of steam introduced under pressure into the retort, a mixer formed with an elongated chamber having outlet in proximity to its inlet, means for introducing a supply of hydrocarbon into said mixer, means for causing superheated steam from the retort to impinge upon the hydrocarbon introduced into the mixer, and means for drawing off the resultant gas from said mixer.

10. The combination of the series of retort-pipes $C'$, $C'$, connections $C^2$, $C^2$, filled with irregular refractory material $c$, means for introducing steam into said retort-pipes, means for heating said retort-pipes, the mixer M, formed with the nozzle $c^3$, for injecting superheated steam from the retort-pipes C', C', into the elongated chamber $m'$, forming a part of said mixer M, said chamber $m'$, formed with the exit $e$, near the inlet $i$, the pipe H, for supplying hydrocarbon to the mixer, and the valve $h'$, for regulating the supply of hydrocarbon for the purpose set forth.

11. In gas apparatus, the combination of the furnace A formed with the combustion-chamber A', surrounded by the space $s$, for the passage of the products of combustion, the retort C formed of the pipes C', C' and connections $C^2$, $C^2$, of small diameter situated entirely within the combustion-chamber and filled with fragmentary refractory material $c$, the pipe $c^2$, and nozzle $c^3$, for introducing superheated steam from the retort C into the mixer M, said mixer M formed with an elongated chamber having outlet in proximity to its inlet, and the pipe H, cross-head $h$, and pipe $c^2$, for introducing hydrocarbon into the mixer, together with means for drawing off the resultant gas from the mixer.

12. In gas apparatus the combination of the primary furnace A, the retort C therein formed of a plurality of long pipes C', and connections $C^2$, of small diameter united together within the furnace A to form a continuous passage filled with fragmentary refractory material, the mixer M formed with an elongated chamber with outlet in proximity to its inlet, means for introducing hydrocarbon into the same, means for injecting superheated steam from the retort C into the hydrocarbon as it is introduced into the mixer M, the exit-pipe $e'$, the valve $f$, the pipe $f'$, the valve $v$, and pipe $v'$, the secondary furnace B, and the retort R therein consisting of a plurality of pipes of small diameter connected together within said furnace and filled loosely with fragmentary refractory material for the purpose set forth.

13. In a gas apparatus, a mixer comprising an elongated chamber having an outlet near one end, the other end being closed, an injector at the outlet end, means for introducing a supply of hydrocarbon into said chamber, means for introducing superheated steam into said chamber to impinge against the hydrocarbon.

14. In a gas apparatus, a mixer comprising an elongated chamber having an inlet and an outlet at the same end, means for supplying hydrocarbon, means for supplying superheated steam, and an injector, the said supply means being disposed at angles to each other, as and for the purpose specified.

CHARLES R. INGHAM.

Witnesses:
GEO. WM. MIATT,
D. W. GARDNER.